Aug. 30, 1960     J. W. HENDRIX     2,950,737
FERTILIZER DISTRIBUTOR

Filed Feb. 20, 1958                    2 Sheets-Sheet 1

INVENTOR.
JOHN W. HENDRIX

ATTORNEYS

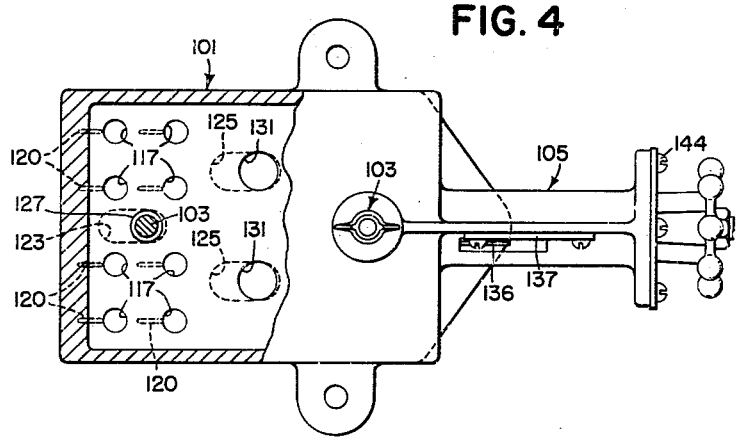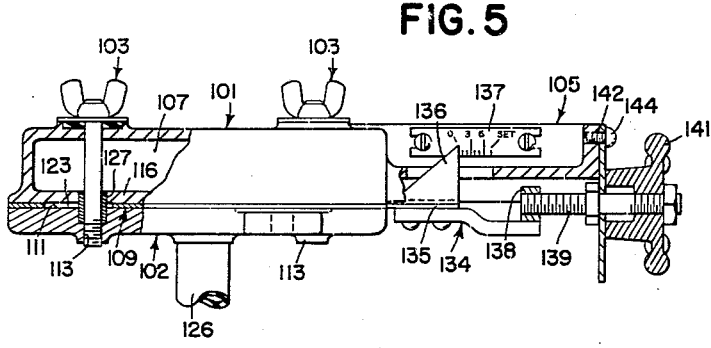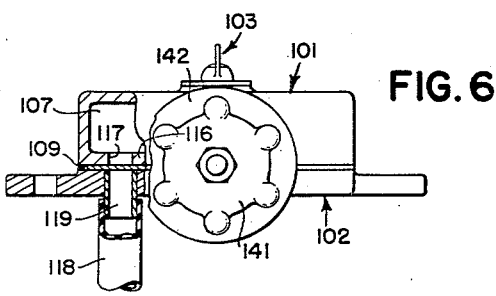

United States Patent Office 2,950,737
Patented Aug. 30, 1960

2,950,737
FERTILIZER DISTRIBUTOR

John W. Hendrix, Madison, Wis., assignor, by mesne assignments, to Deere & Company, a corporation of Delaware Filed Feb. 20, 1958, Ser. No. 716,345

6 Claims. (Cl. 137—625.48)

The present invention relates generally to agricultural implements and more particularly to fertilizer distributors, especially those adapted for use with liquid fertilizer.

The object and general nature of the present invention is the provision of new and improved means for controlling or metering the flow of liquid fertilizer to the distributing means, usually nozzles or the like that are adapted to direct the metered flow of liquid fertilizer into or onto the ground. More specifically, it is a principal feature of this invention to provide means for accurately metering or controlling the flow of liquid fertilizer over a wide range of available adjustment. For example, an implement incorporating the features of this invention is capable of producing accurately metered fertilizer distribution in almost any quantity desired from five pounds per acre to 700 pounds per acre, without requiring any variation in the speed or rate of movement of the implement over the ground.

More specifically, one important feature of the present invention is the provision of fertilizer metering mechanism that includes inlet and outlet tubes or passageways, portions of which constitute inlet means while the other constitute outlet means, with a fixed orifice plate and a shiftable adjusting plate having cooperating orifices, preferably elongated, cooperating with the outlet passages, and one or more larger openings cooperating with the inlet passages, whereby shifting the adjusting plate provides an infinite number of metering adjustments, so far as the outlet passages are concerned, but full inlet flow is available in any position of the adjustable or shiftable plate.

These and other objects and advantages of the present invention will be apparent to those skilled in the art after a consideration of the following detailed description of the preferred structure in which the principles of this invention have been incorporated, taken in conjunction with the accompanying drawings in which the preferred structure has been shown by way of illustration.

In the accompanying drawings:

Fig. 4 is a plan view, certain portions being broken away, of a modified form of this invention.

Fig. 5 is a side view, certain parts being broken away, of the metering head shown in Fig. 4.

Fig. 6 is an end view, certain portions being broken away, of the metering head shown in Figs. 4 and 5.

Figure 1:
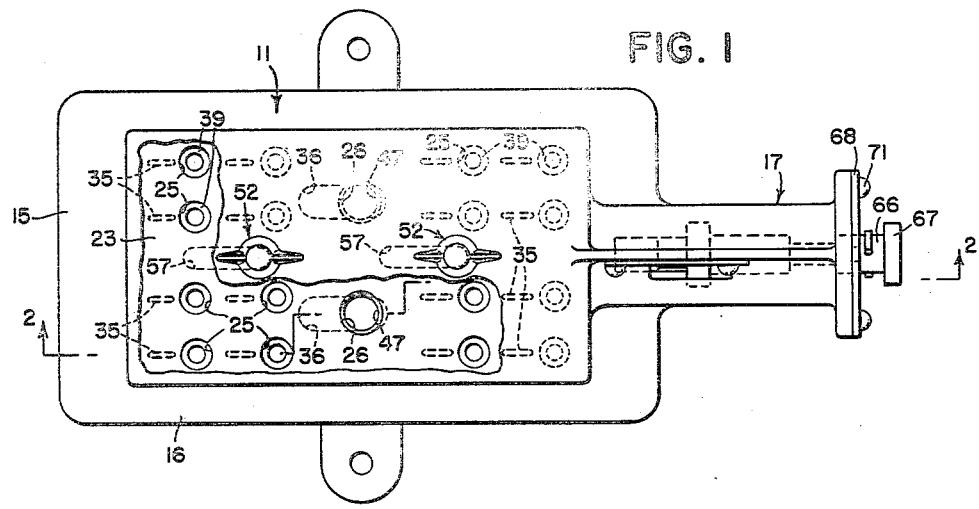
Fig. 1 is a plan view of a metering head in which the principles of the present invention have been embodied.

The metering head of the present invention comprises a housing section 11 and a base section 12, formed preferably of suitable material, such as cast iron or the like. The housing section 11 is formed with an interior chamber 13 having end and side walls shaped to form an encircling planar flange 15 and peripherally arranged skirt portions 16. At one end of the housing section there is an outwardly disposed extension 17 shaped to receive and support movable plate adjusting means to which more detail reference will be made below.

The inner face 21 of the housing flange portion 15 is accurately formed to lie in a plane and receives a gasket 22 that is disposed between the face 21 and a fixed orifice plate 23. The orifice plate 23 is provided with a plurality of openings 25 formed in the end portions of the plate 23 and a pair of central openings 26.

The base section 12 has an accurately formed flat upper face 31 and is shaped to lie within the skirt portion 16 of the housing section 11. The base section 12 receives a shiftable adjustable plate 33 that is formed preferably of such material as Micarta or the like and a portion 34 of the adjusting plate extends outwardly of the associated housing sections underneath the extension 17. The adjusting plate is provided with a plurality of elongated openings 35, one for each of the orifice plate openings 25, and the adjusting plate also is provided with relatively large openings 36, one for each of the openings 26 in the orifice plate 23.

The base section is provided with a plurality of apertures 38, one for each of the orifice plate openings 25, and each of these openings 38 receives a tube end member 39, which may be threaded, welded, otherwise fastened in the openings 38. The tube end members 39 receive associated flexible tubes 41 that lead to the points of distribution of the liquid fertilizer or other material being metered. It will be seen from Fig. 2 that the tube end members 39 are flush with the flat face 31 of the base section 12 and that the adjusting plate 33 overlies the openings 38, being disposed between the face 31 of the base section and the relatively fixed orifice plate 23.

The adjusting plate 33 is also arranged to overlie the inner ends of the inlet tubes 46, the inner end of each of which is provided with a tube end member 47 threaded, welded, or otherwise fixed in an associated opening 48 formed in the generally central portion of the base section 12 in axially aligned relation with respect to the central openings 26 of the fixed orifice plate 23. The openings 36 in the shiftable adjusting plate 33 overlie the inner ends of the tube end members 47, but the effective areas of the adjusting plate openings 36 are such that in any position of the plate 33, the tubes 46 have full communication with the chamber 13 through the openings 26 and 36. The housing section 11 and base section 12 are adapted to be clamped together with the adjusting plate 33 sealed tightly between the base section face 31 and the adjacent surface of the fixed orifice plate 23. To this end, the base section 12 is provided with a pair of tapped openings 51 in each of which the threaded portion of a wing bolt 52 is received. Each of the wing bolts 52 is provided with the head 53 having wings 54, each head bearing against an associated exterior washer 55. The bolts 52 are passed through suitable apertures formed in the fixed orifice plate 23 and through elongated openings 57 formed in the shiftable adjusting plate 33, the openings 57 being elongated so as to accommodate the shifting movement of the adjusting plate 33 when varying the rate of flow, which can be normally done after the bolts 52 have been loosened to release the clamping pressure which is exerted upon the adjusting plate by the housing section 11 and base section 12 when the bolts 52 are tightened.

Figure 2:
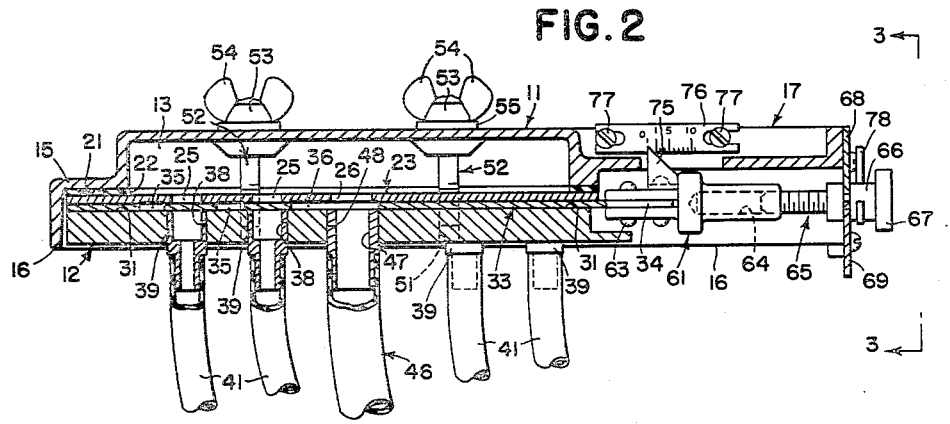
Fig. 2 is a sectional view taken generally along the line 2—2 of Fig. 1.
Figure 3:
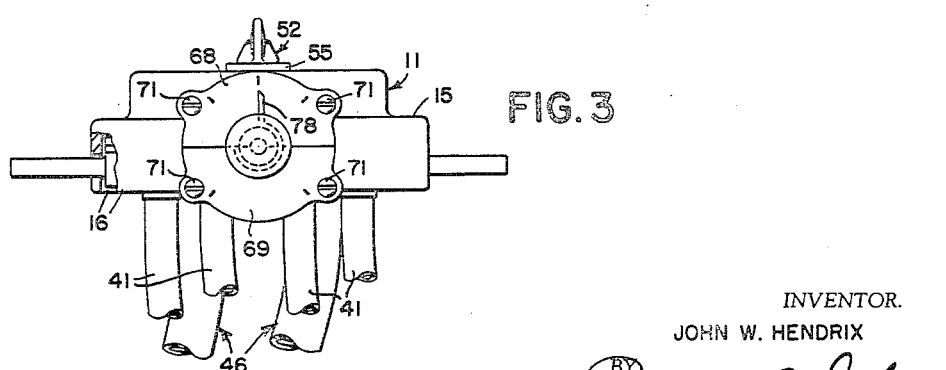
Fig. 3 is an end view of the metering heads shown in Figs. 1 and 2, the end view being taken from the right, as indicated by the line 3—3 in Fig. 2.

The means for shifting the position of the adjusting plate 33 when the bolts 52 are loosened is best shown in Figs. 2 and 3. As will be seen from Fig. 2, the extended portion 34 of the orifice plate 33 fixedly receives a screw threaded socket member 61, the member 61 being fixed to the orifice plate extension 34 by means of rivets 63. The threaded socket section 64 of the member 61 receives a threaded adjusting screw 65, the threaded inner end of which is screwed into the socket 64 and the outer portion of which is formed as a head 66 having a thumb piece 67. The member 66 also has a groove into which upper and lower plates 68 and 69 are received, these plates being fixed by cap screws 71 or other suitable means to the outer end portion of the extension 17. The plates 68 and 69 serve as means to rotatably receive the head 66 but prevent any axial displacement of the latter relative to the housing section 11. Thus, turning the thumb piece 67 in one direction or the other will serve to shift the position of the adjusting plate 33 whereby the outlet openings 35 uncover to a lesser or greater degree portions of the orifice plate openings 25, and thus flow through the outlet tube end members 39 and tubes 41 is controlled.

In order to provide a means for indicating the amount flow available in any selected position of the adjusting plate 33, a pointer member 75 is fixed to the member 61 and has an end movable along a graduated indicia-bearing plate 76 that is suitably fixed, as by adjustable screw and slot means 77, to the adjacent portion of the housing section 17. To provide a further indication of the adjusting plate position and the corresponding rate of flow, a spring pointer 78 is fixed frictionally to the hub of the head 66 so as to provide for an indication of different positions of the adjustment of the adjusting plate between the graduations over which the pointer 75 moves.

In operation, referring to the form of the invention shown in Figs. 1-3, liquid fertilizer or other material that is to be metered by the device shown in these figures is admitted through the inlet tubes 46 and such material flows upwardly through the openings 26 and 36 into the chamber 13. At a rate determined by the adjusting plate 33, such material flows outwardly through the uncovered portions of the apertures 25 in the fixed orifice plate 23 and through the openings 35 in the orifice plate 33 into the tube end members 35 and outwardly through the tubes 41 to points of utilization. To effect any desired adjustment of the adjusting plate 33, the bolts 52 are first loosened and then the member 65 is turned in one direction or the other, to bring the plate 33 to the desired position, after which the wing bolts 52 are retightened to effectively seal the adjusting plate in position to prevent any leakage.

A modified form of the present invention is shown in Figs. 4-6, and from these figures it will be seen that this form of invention includes a housing section 101 and a base section 102 suitably clamped together by wing bolt means 103. The housing section 101 carries an extension 105 which serves substantially the same purpose as the extension 17 described above. The housing section 101 is provided with an interior chamber 107 and the inner face of the latter is flat and receives an apertured adjusting plate 109. The latter plate lies against a similarly formed flat plate or face section 111 formed on the inner portion of the base section 102. The latter section is provided with apertured portions 113 that are tapped to receive the threaded ends of the wing bolts 103. The heads of the latter bolts are disposed against the outer face of the housing section 101.

The housing section 101 is formed with or carries an inner wall 116 that serves about the same purpose as the fixed orifice plate 23 described above, having a plurality of round apertures indicated at 117 in Fig. 4. A plurality of outlet tubes 118, similar to those indicated at 41 in Fig. 2, are connected with the base section 102 and communicate through tube end members 119 with the apertures 117 in the diaphragm or orifice plate section 116 of the housing section 101. Slotted openings 120 are formed in the associated portions of the shiftable adjusting plate 109 and lie between the orifice plate openings 117 and the tube end members 119 (Fig. 6) and the openings in which the latter are disposed.

The adjusting plate is also apertured, as indicated at 123 and 125 in Fig. 4, the apertures 123 being elongated and receiving locating bushings 127 that are carried in enlarged portions of the base sections openings 113 and aligned openings in the orifice plate section 116, as best shown in Fig. 5. The wing bolts 103 extend through the associated locating bushings 127. Similarly, the openings 125 in the adjusting plate 109 communicate with openings 131 formed in the orifice plate portion 116, which latter openings also communicate with inlet tubes one of which is shown at 126 in Fig. 5.

The liquid to be metered enters the chamber 107 through the apertures 125 and 131. The liquid flows outwardly from the chamber 107 through the openings 117 and the metering slots or apertures 120 in the adjusting plate 109. The latter plate may be shifted relative to the associated housing and base section by loosening the wing bolts 103 and operating the associated adjusting means. Such adjusting means is similar to that shown in Figs. 1-3 and includes a member 134 riveted to the extended end 135 of the adjusting plate 109, which rivets also attach a pointer member 136 to the member 134. The member 136 moves over a graduated adjustable scale 137. The outer end portion 138 of the member 134 receives an adjusting member 139 which carries a hand wheel 141. The adjusting member is held against axial displacement by a pair of plates 142 and 143 that are fixed to the associated portion of the extension 105 by cap screws 144 or other suitable means. The hand wheel 141 may have suitable pointer means that indicates positions of the adjusting plate 109 intermediate the positions indicated by the graduations on the plate 137.

While I have shown and described above the preferred structure in which the principles of the present invention have been incorporated, it is to be understood that my invention is not to be limited to the particular details shown and described above, but that widely different means may be employed in the practice of the above broader aspects of my invention.

What I claim, therefore, and desire to secure by Letters Patents is:

1. A liquid metering device comprising a pair of sections having mating flat surfaces, each of said surfaces lying in a plane; a flat aperture adjusting plate movably disposed between said mating surfaces in interfitting relation therewith, a plurality of tubes carried by one of said sections and having inner ends adapted to communicate with the space between said sections, said adjusting plate overlying the inner ends of said tubes and having a plurality of apertures, one for each of said tubes, shifting said adjusting plate to different selected positions serving to vary the effective area of each tube end through which flow is permitted, the effective areas of all of said tubes being varied through substantially the same extent, an additional tube constituting inlet means carried by said one section, said adjusting plate having an additional aperture associated therewith and disposed in line with said additional tube, and means forming a chamber carried by the other section and communicating with all of said tubes, said additional adjusting plate aperture being larger in area than the associated inlet tube so that full inlet flow is available in any position of adjustment of said adjusting plate.

2. Liquid fertilizer metering means affording a wide range of substantially identical adjustments for each of a plurality of outlets, comprising an orifice chamber including a housing section, an apertured base section, a shiftable adjusting plate disposed between said housing and base sections, the latter section including a plurality of outlet passages and at least one inlet passage, said adjusting plate having a plurality of outlet apertures arranged to overlap by varying amounts the outlet passages of said base section, thus providing for adjustment of outlet flow by shifting said adjusting plate relative to said base section, the amount of overlap of each plate outlet relative to the associated base section outlet being substantially identical with the amount of overlap of the other plate outlets relative to the base section outlets associated therewith, said adjusting plate also having at least one inlet opening arranged to receive and pass into the housing section the full inlet flow irrespective of the position of said adjusting plate relative to the base section.

3. The invention set forth in claim 2, further characterized by said plate and the cooperating portions of said housing and base sections being planar parts, means acting generally perpendicular to the planes of said housing and base sections fixedly clamping said sections together with said adjusting plate in the desired position of adjustment therebetween, said clamping means including one or more parts extending from one section to the other, and, elongated opening means in said adjusting plate shaped to receive said one or more parts in any position of the adjusting plate.

4. The invention set forth in claim 3, further characterized by said clamping means being releasable, and micrometer means connected between one of said sections and said adjusting plate for shifting the latter in either direction parallel to the plane of said plate when the clamping means is released, said micrometer means being connected to shift said adjusting plate to simultaneously increase or decrease the effective area of overlap of said outlet passages.

5. The invention set forth in claim 2, further characterized by an extension on one of said sections, said adjusting plate having a portion extending outwardly from between said base and housing sections adjacent said extension, and means acting between the latter and said adjusting plate for adjusting the position of the adjusting plate.

6. Liquid fertilizer metering means affording a wide range of adjustment, comprising an orifice chamber including a housing section having a flat planar inner face serving as a relatively fixed apertured orifice plate, a flat apertured base section, a shiftable adjusting plate having flat oppositely disposed parallel faces disposed between said housing and base sections, the latter section including a plurality of inlet and outlet passages, the inlet and outlet passages communicating and registering with the apertures of said orifice plate, said adjusting plate having a plurality of outlet apertures registrable with said outlet passages, said plate being shiftable relative to said base section to provide for flow adjustment by shifting said adjusting plate relative to said base section, said adjusting plate also having one or more apertures registrable with said inlet passages, means limiting movement of the adjusting plate, said openings being longer than the permissible extent of movement of the adjusting plate so as to provide for an amount of flow into said housing section sufficient to supply an inlet flow adequate to accommodate the desired flow out through said outlet apertures in the corresponding adjustment of the adjusting plate, and means to sealingly fix said adjusting plate in position between said base section and said orifice plate.

References Cited in the file of this patent

UNITED STATES PATENTS

| | | |
|---|---|---|
| 966,564 | Koegler | Aug. 9, 1910 |
| 1,014,070 | Laxton | Jan. 9, 1912 |
| 2,331,790 | Nichols | Oct. 12, 1943 |
| 2,651,320 | Hirsch et al. | Sept. 8, 1953 |
| 2,673,662 | Bensinger | Mar. 30, 1954 |
| 2,827,928 | Guckel | Mar. 25, 1958 |